(12) United States Patent
Jeon et al.

(10) Patent No.: US 7,496,834 B2
(45) Date of Patent: Feb. 24, 2009

(54) ELECTRONIC DOCUMENT REQUEST/SUPPLY METHOD BASED ON XML

(75) Inventors: Hye Jeong Jeon, Seoul (KR); Kyoung Ro Yoon, Seoul (KR); Bae Geun Kang, Sungnam-si (KR)

(73) Assignee: LG Electronics, Inc., Seoul (KR)

( * ) Notice: Subject to any disclaimer, the term of this patent is extended or adjusted under 35 U.S.C. 154(b) by 326 days.

(21) Appl. No.: 10/645,503

(22) Filed: Aug. 22, 2003

(65) Prior Publication Data

US 2004/0039992 A1    Feb. 26, 2004

(30) Foreign Application Priority Data

Aug. 23, 2002 (KR) ............... 10-2002-0049966
Oct. 15, 2002 (KR) ............... 10-2002-0062827

(51) Int. Cl.
*G06F 17/00* (2006.01)

(52) U.S. Cl. .................. 715/234; 715/236; 715/271

(58) Field of Classification Search .......... 715/500, 715/501.1, 511, 512, 513, 515, 200, 205, 715/209, 229, 230, 234, 236, 271
See application file for complete search history.

(56) References Cited

U.S. PATENT DOCUMENTS

| | | | |
|---|---|---|---|
| 4,847,902 A | 7/1989 | Hampson | |
| 5,499,365 A | 3/1996 | Anderson et al. | |
| 5,862,325 A | 1/1999 | Reed et al. | |
| 5,892,900 A * | 4/1999 | Ginter et al. | 726/26 |
| 6,088,717 A | 7/2000 | Reed et al. | |
| 6,185,329 B1 * | 2/2001 | Zhang et al. | 382/176 |
| 6,330,569 B1 | 12/2001 | Baisley et al. | |
| 6,473,794 B1 * | 10/2002 | Guheen et al. | 709/223 |
| 6,675,267 B2 * | 1/2004 | Rovati | 711/150 |
| 6,675,353 B1 | 1/2004 | Friedman | |
| 6,681,395 B1 * | 1/2004 | Nishi | 725/45 |
| 6,760,746 B1 * | 7/2004 | Schneider | 709/203 |
| 6,847,977 B2 * | 1/2005 | Abajian | 707/102 |
| 6,873,693 B1 * | 3/2005 | Langseth et al. | 379/201.02 |

(Continued)

FOREIGN PATENT DOCUMENTS

EP    0384184 A2    2/1990

(Continued)

OTHER PUBLICATIONS

J. Robie, Combining and Querying XML Data with SQL, Dec. 1999, from the Internet, pp. 1-14.*

(Continued)

*Primary Examiner*—Stephen S Hong
*Assistant Examiner*—Gregory J Vaughn
(74) *Attorney, Agent, or Firm*—Sidley Austin LLP

(57) ABSTRACT

There is provided a method for requesting an electronic document based on XML in which the electronic document is created using a syntax defining a structure of a constructed electronic document. The electronic document request method can include creating a request document including an element name/attribute name based on a previously prescribed syntax without defining an additional syntax for requesting the electronic document, requesting a supply of the electronic document having an information on the element name/attribute name recorded in the request document, and receiving the electronic document including the information on the requested element name/attribute name.

67 Claims, 10 Drawing Sheets

U.S. PATENT DOCUMENTS

| | | | |
|---|---|---|---|
| 6,877,002 B2* | 4/2005 | Prince | 707/5 |
| 6,904,454 B2 | 6/2005 | Stickler | |
| 6,912,529 B1 | 6/2005 | Kolfman | |
| 6,941,300 B2* | 9/2005 | Jensen-Grey | 707/4 |
| 7,085,755 B2 | 8/2006 | Bluhm et al. | |
| 2002/0045951 A1* | 4/2002 | Maesaka et al. | 700/1 |
| 2002/0059126 A1* | 5/2002 | Ricciardi | 705/36 |
| 2002/0100049 A1* | 7/2002 | Yamato et al. | 725/47 |
| 2002/0122080 A1* | 9/2002 | Kunii et al. | 345/864 |
| 2002/0126997 A1* | 9/2002 | Kunii et al. | 386/95 |
| 2002/0143976 A1 | 10/2002 | Barker et al. | |
| 2002/0150387 A1* | 10/2002 | Kunii et al. | 386/83 |
| 2002/0152244 A1 | 10/2002 | Dean et al. | |
| 2002/0156602 A1* | 10/2002 | Kunii et al. | 702/188 |
| 2003/0009472 A1 | 1/2003 | Azami et al. | |
| 2003/0036395 A1* | 2/2003 | Proidl | 455/466 |
| 2003/0037181 A1* | 2/2003 | Freed | 709/328 |
| 2003/0074419 A1* | 4/2003 | VanderDrift | 709/218 |
| 2003/0196165 A1 | 10/2003 | Jung | |
| 2003/0197733 A1 | 10/2003 | Beauchamp et al. | |
| 2003/0233241 A1* | 12/2003 | Marsh | 705/1 |
| 2004/0015369 A1 | 1/2004 | Kim et al. | |
| 2005/0193408 A1 | 9/2005 | Sull et al. | |
| 2005/0193425 A1 | 9/2005 | Sull et al. | |

FOREIGN PATENT DOCUMENTS

| | | |
|---|---|---|
| EP | 0384184 A2 | 8/1990 |
| EP | 1 126 707 A1 | 8/2001 |
| JP | 09-305622 | 11/1997 |
| JP | 9305622 | 11/1997 |
| JP | 2001186497 | 7/2001 |
| JP | 2001337833 | 12/2001 |
| KR | 1020020058639 A | 7/2002 |
| WO | WO97/29591 | 8/1997 |
| WO | WO 01/52117 A2 | 7/2001 |
| WO | WO 01/55900 A1 | 8/2001 |
| WO | WO 01/95155 A2 | 12/2001 |
| WO | WO 02/27520 A1 | 4/2002 |
| WO | WO 02/063494 A2 | 8/2002 |
| WO | WO 02/073393 A1 | 9/2002 |
| WO | WO 2004/045209 A1 | 5/2004 |

OTHER PUBLICATIONS

Chinese Office Action for Chinese Application No. 03819565.8(PCT/KR2003/001705), dated Jun. 22, 2007, 22 pages.

Korean Office Action for Korean Application No. 10-2003-0025093, dated Jan. 20, 2006, 2 pages.

European Search Report for Application No. EP 03811141, dated Oct. 10, 2005, 4 pages.

Hicks et al., "A Hypermedia Version Control Framework," ACM Transactions on Information Systems, vol. 16, No. 2, Apr. 1998, pp. 127-160.

Ramaswamy et al., "Automatic Detection of Fragments in Dynamically Generated Web Pages," ACM, 2004, pp. 443-454.

Chien et al., "Efficient Schemes for Managing Multiversion XML Documents," Dec. 19, 2002, Spring-Velag, pp. 332-353.

Chien et al., "XML Document Versioning," Sep. 2001, SIGMOD Record, vol. 30, No. 3, pp. 46-53.

Wong et al., "Managing and Querying Multi-Version XML Data with Update Logging," ACM, 2002, pp. 76-77.

Office Action for Canadian Application No. 2,506,060, dated Jun. 6, 2007, 1 page.

* cited by examiner

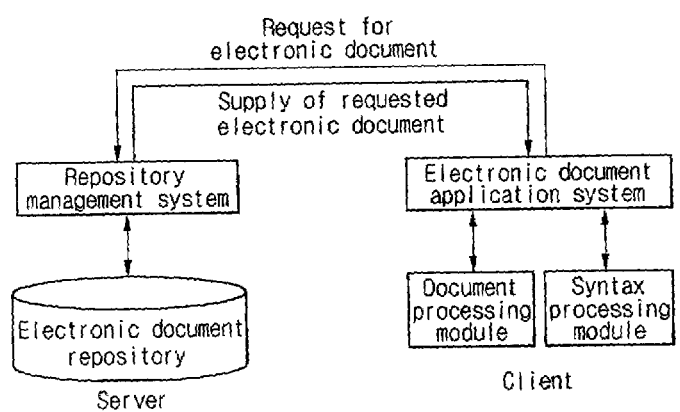
Fig.2
Related Art
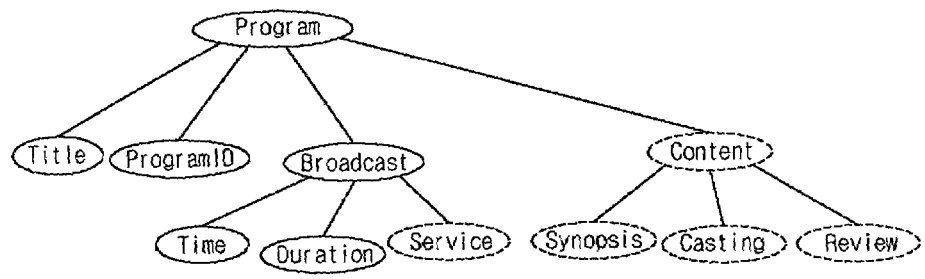

Fig.3
Related Art

```
<?xml version="1.0" encoding="UTF-8"?>
<!ELEMENT Programs (Program+)>
<!ELEMENT Program (Title, ProgramID, Broadcast, Content?)>
<!ELEMENT Title (#PCDATA)>
<!ELEMENT ProgramID (#PCDATA)>
<!ELEMENT Broadcast (Time, Duration, Service?)>
<!ELEMENT Time (#PCDATA)>
<!ELEMENT Duration (#PCDATA)>
<!ELEMENT Service (#PCDATA)>
<!ELEMENT Content (Synopsis*, Casting*, Review*)>
<!ELEMENT Synopsis (#PCDATA)>
<!ELEMENT Casting (#PCDATA)>
<!ELEMENT Review (#PCDATA)>
```

Fig.4
Related Art

```xml
<?xml version="1.0" encoding="UTF-8"?>
<schema targetNamespace="http://www.tvguide.com"
        xmlns=http://www.w3c.org/2001/XMLSchema
        elementFromDefault="unquialified">
  <import namespace="http://www.w3c.org/XML/1998/namespace"
          schemaLocation="./xml-1998.xsd"/>

<element name="Programs">
    <complexType>
      <sequence>
        <element name="Program" maxOccurs="unbounded">
          <complexType>
            <sequence>
              <element name="Title"/>
              <element name="ProgramID"/>
              <element name="Broadcast">
                <complexType>
                  <sequence>
                    <element name="Time" type="dateTime"/>
                    <element name="Duration" type="dateTime"/>
                    <element name="Service" type="string" minOccur="0"/>
                  </sequence>
                </complexType>
              </element>
              <element name="Content" minOccur="0">
                <complexType>
                  <sequence>
                    <element name="Synopsis" type="string" minOccur="0" maxOccurs="unbounded"/>
                    <element name="Casting" type="string" minOccur="0" maxOccurs="unbounded"/>
                    <element name="Review" type="string" minOccur="0" maxOccurs="unbounded"/>
                  </sequence>
                </complexType>
              </element>
            </sequence>
          </complexType>
        </element>
      </sequence>
    </complexType>
  </element>
</schema>
```

Fig.5
Related Art

```
<?xml version="1.0" encoding="UTF-8"?>
<Programs>
  <Program>
    <Title>Friends</Title>
    <ProgramID>KTLA-2003-0509</ProgramID>
    <Broadcast>
      <Time>2003-05-09 19:00</Time>
      <Duration>30m</Duration>
      <Service>KTLA</Service>
    </Broadcast>
    <Content>
      <Synopsis>
It all begins when a pregnant Rachel (Jennifer Aniston) realizes that her dating days may be over after she gives birth. Hoping to lift her spirits, Joey (Matt LeBlanc) takes his blue roomie out for a night on the town, complete with flowers, dinner and some juicy revelations about their best "date moves." But once the pair part ways at evening's end, Joey is shaken by newfound feelings for his friend.
      </Synopsis>
    </Content>
  </Program>
</Programs>
```

Fig.6
Related Art

```
<?xml version="1.0" encoding="UTF-8"?>
<Programs>
  <Program>
    <Title>Sesame Street</Title>
    <ProgramID>KCET-2003-0509</ProgramID>
    <Broadcast>
       <Time>2003-05-09 12:00</Time>
       <Duration>60m</Duration>
       <Service>KCET</Service>
    </Broadcast>
    <Content>
       <Casting>Allison Bartlett O'Reilly</Casting>
       <Casting>Linda Bove</Casting>
       <Casting>Kristen Chenowith</Casting>
       <Casting>Emilio Delgado</Casting>
  </Program>
</Programs>
```

Fig.7

```
<?xml version="1.0" encoding="UTF-8"?>
<Programs>
  <Program>
    <ProgramID>KTLA-2003-0509</ProgramID>
    <Content>
       <Review></Review>
    </Content>
  </Program>
</Programs>
```

Fig.8

```xml
<?xml version="1.0" encoding="UTF-8"?>
<Programs>
  <Program>
    <Title>Friends</Title>
    <ProgramID>KTLA-2003-0509</ProgramID>
    <Broadcast>
       <Time>2003-05-09 19:00</Time>
       <Duration>30m</Duration>
       <Service>KTLA</Service>
    </Broadcast>
    <Content>
       <Synopsis>
```
It all begins when a pregnant Rachel (Jennifer Aniston) realizes that her dating days may be over after she gives birth. Hoping to lift her spirits, Joey (Matt LeBlanc) takes his blue roomie out for a night on the town, complete with flowers, dinner and some juicy revelations about their best "date moves." But once the pair part ways at evening's end, Joey is shaken by newfound feelings for his friend.
```xml
       </Synopsis>
       <Review>
```
Always best as a sparkling romantic comedy, Friends is funnier, sharper, sweeter and more satisfying than at any time since the early stages of Monica (Courteney Cox Arquette) and Chandler's (Matthew Perry) once-secret courtship.

Unquestionably, the revelation that Rachel (Jennifer Aniston) is pregnant by Ross (David Schwimmer) — an unexpected twist in a rocky relationship Ross recently described as "one heck of a see-saw" — has brought renewed comic vigor and heart to a show that a year ago was looking awfully worn out.

Of course, when a long-running series brings a baby on board, it's difficult to know if it will be seen as a blessed event or as the beginning of the end. In the case of Friends, maybe it's a little of both. ...
```xml
       </Review>
    </Content>
  </Program>
</Programs>
```

Fig.9

```
<?xml version="1.0" encoding="UTF-8"?>
<Programs>
  <Program>
    <Content>
       <Casting>Lisa Kudrow</Casting>
    </Content>
  </Program>
</Programs>
```

Fig. 10

```xml
<?xml version="1.0" encoding="UTF-8"?>
<Programs>
  <Program>
    <Title>Friends</Title>
    <ProgramID>KTLA-2003-0509</ProgramID>
    <Broadcast>
       <Time>2003-05-09 19:00</Time>
       <Duration>30m</Duration>
       <Service>KTLA</Service>
    </Broadcast>
    <Content>
       <Synopsis>
```
It all begins when a pregnant Rachel (Jennifer Aniston) realizes that her dating days may be over after she gives birth. Hoping to lift her spirits, Joey (Matt LeBlanc) takes his blue roomie out for a night on the town, complete with flowers, dinner and some juicy revelations about their best "date moves." But once the pair part ways at evening's end, Joey is shaken by newfound feelings for his friend.
```xml
       </Synopsis>
    </Content>
  </Program>
  <Program>
    <Title>Mother</Title>
    <ProgramID>KTLA-2003-0510</ProgramID>
    <Broadcast>
       <Time>2003-05-10 15:00</Time>
       <Duration>105m</Duration>
       <Service>PBS</Service>
    </Broadcast>
    <Content>
       <Synopsis>
```
Debbie Reynolds and writer-director Albert Brooks play a dysfunctional mother and son in this charming comedy from 1996.

Brooks stars as John Henderson, a neurotic, twice-divorced sci-fi writer who moves back home with his disapproving mom to get to the root of his problem with women. Arguments over food and spending habits soon arise, and Mom's house becomes a comic battlefield littered with subtle insults about John's writing. Reynolds' scene-stealing performance earned her a Golden Globe nomination for Best Actress. Rob Morrow stars as Brooks' younger brother.
```xml
       </Synopsis>
    </Content>
  </Program>
</Programs>
```

Fig.11

```
<?xml version="1.0" encoding="UTF-8"?>
<Invalid>
  <Programs>
    <Program>
      <Title>Larry King</Title>
      <ProgramID>CNN-2003-0509</ProgramID>
      <Broadcast>
        <Time>2003-05-10 00:00</Time>
        <Duration>60m</Duration>
        <Service>CNN</Service>
      </Broadcast>
      <Content>
        <Synopsis> An interview series with the famed broadcaster.</Synopsis>
      </Content>
    </Program>
  </Programs>
</Invalid>
```

Fig. 12

```
<?xml version="1.0" encoding="UTF-8"?>
<Programs>
  <Program Invalid="true">
    <Title>Larry King</Title>
    <ProgramID>CNN-2003-0509</ProgramID>
    <Broadcast>
       <Time>2003-05-10 00:00</Time>
       <Duration>60m</Duration>
       <Service>CNN</Service>
    </Broadcast>
    <Content>
       <Synopsis> An interview series with the famed broadcaster.</Synopsis>
    </Content>
  </Program>
</Programs>
```

ELECTRONIC DOCUMENT REQUEST/SUPPLY METHOD BASED ON XML

BACKGROUND OF THE INVENTION

1. Field of the Invention

The present invention relates to an electronic document request/supply method, and more particularly, to an XML-based electronic document request/supply method.

2. Background of the Related Art

In recent years, an extensible markup language (hereinafter, referred to as "XML") is widely used to create electronic documents. The utilization of XML increases rapidly throughout the world, and government and public offices as well as general enterprises are increasingly introducing the XML. These electronic documents are generally created on the basis of a syntax prescribed by each organization. Specific languages have been provided for searching XML documents.

However, related art methods for searching or requesting electronic documents have various disadvantages. In a related art method for requesting a supply of the electronic documents using these specific search languages, a user requesting the electronic document should learn an additional search language and designate a structure of the XML document to be supplied as the search result. Accordingly, the related art methods are ineffective to the user who wants to request and receive the electronic document created based on the previously designated syntax.

Further, in case of using the document requested and supplied in the related art methods, the entire contents provided initially should be transmitted because there is no method of subsequent or additional notifications of contents deleted because of a change of document contents or notifications of invalid contents. The above references are incorporated by reference herein where appropriate for appropriate teachings of additional or alternative details, features and/or technical background.

SUMMARY OF THE INVENTION

An object of the invention is to solve at least the related art problems and/or disadvantages and to provide at least the advantages described hereinafter.

Another object of the present invention is to provide an electronic document request/supply method based on XML that substantially obviates one or more problems due to limitations and disadvantages of the related art.

Another object of the present invention to provide an electronic document request/supply method based on XML that retrieves an XML-based electronic document according to a specific syntax.

Another object of the present invention to provide an electronic document request/supply method based on XML in which the electronic documents are supplied using a previously prescribed syntax without learning or using the syntax of additional languages to request/supply the electronic document.

Another object of the present invention to provide an electronic document request/supply method based on XML in which an electronic document application system utilized by a requester requests a search of the electronic document and processes the electronic document supplied from an electronic document repository using only a method or algorithm for processing a prescribed syntax.

Another object of the present invention is to provide an electronic document upgrade method based on XML in which a transmission efficiency is improved by transmitting selected contents or indications to update a previously supplied document.

Another object of the present invention is to provide an electronic document upgrade method based on XML in which a transmission efficiency is improved by transmitting only deleted, invalid or not currently valid contents among contents of a previously supplied document and not transmitting an entire previously supplied or deleted document.

To achieve at least the above-identified objects in a whole or in part according to the present invention, there is provided a method for requesting an electronic document based on XML, the electronic document being created using a syntax defining a structure of the electronic document, the method including creating a request document including an element name/attribute name based on a previously prescribed syntax without defining an additional syntax for requesting the electronic document, and requesting delivery of the electronic document having an information on the element name/attribute name recorded in the request document.

To further achieve at least the above-identified objects in a whole or in part according to the present invention, there is provided a method for supplying an electronic document based on XML, the electronic document including values of element name/attribute name contained in a request document, the request document being requested using a syntax defining a structure of the constructed electronic document, the method including providing an element name/attribute name based on a previously defined syntax in the request document among required elements, optional elements, required attributes or optional attributes, and selectively providing an identifier information in the request document identifying an information on the element name/attribute name, wherein at least one electronic document that is supplied is valid for the previously defined syntax and includes values of the element name/attribute name used in the request document, and wherein when the identifier information is provided the supplied electronic document satisfies the values of the element name/attribute name and an identifier value of the request document including a request information.

To further achieve at least the above-identified objects in a whole or in part according to the present invention, there is provided a method for supplying an electronic document based on XML using a syntax defining a structure of the electronic document, the method including supplying a document including an invalid element to delete subsequently invalid contents contained in a corresponding previously supplied document, wherein deletion of predetermined contents of the corresponding document is notified by adding to-be-deleted contents to the invalid element.

To further achieve at least the above-identified objects in a whole or in part according to the present invention, there is provided a method for supplying an electronic document based on XML using a syntax defining a structure of the electronic document, the method including deleting of predetermined contents of a corresponding document by supplying a subsequent document including an attribute identifying invalidity of the corresponding document to delete contents contained in the corresponding document.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 1 is a schematic view of a related art client/server structure that requests/supplies a general XML-based electronic document;

FIG. 2 is an exemplary view showing a syntax structure of a broadcasting program produced by a related art method of creating an XML-based electronic document;

FIG. 3 is an exemplary view of a document type definition (DTD) showing a syntax of a broadcasting program produced by a related art method of creating an XML-based electronic document;

FIG. 4 is an exemplary view of an XML schema showing a syntax of a broadcasting program electronic document produced by a related art method of creating an XML-based electronic document;

FIGS. 5 and 6 ate exemplary views of a broadcasting program electronic document produced by a related art method of creating an XML-based electronic document;

FIG. 7 is an exemplary view of a request document requesting a supply of an electronic document created by a preferred embodiment of an XML-based electronic document request method according to the present invention;

FIG. 8 is an exemplary view of an electronic document supplied according to the request document of FIG. 7;

FIG. 9 is another exemplary view of a request document requesting a supply of an electronic document created by a preferred embodiment of an XML-based electronic document request method according to the present invention;

FIG. 10 is an exemplary view of an electronic document supplied according to the request document of FIG. 9;

FIG. 11 is an exemplary view of providing information on a deleted document by supplying a document with an element name notifying an invalid document according to another preferred embodiment of an XML-based electronic document supply method according to the present invention; and FIG. 12 is an exemplary view of providing information on a deleted document by supplying a document with an attribute name notifying an invalid document according to yet another preferred embodiment of an XML-based electronic document supply method according to the present invention.

DETAILED DESCRIPTION OF PREFERRED EMBODIMENTS

The XML-based electronic documents are often managed in a client/server structure that stores the documents in the server and provides desired electronic documents according to the user's request. Such a client/server structure is illustrated in FIG. 1.

FIG. 1 is a schematic view of the client/server structure that requests/supplies a general XML-based electronic document. As shown in FIG. 1, the client is a document requester/user side, and the server is a document provider side. Accordingly, if a system requesting and using a document has functions of storing and providing the document at the same time, the system can simultaneously act as the client and the server according to its role.

A language for searching these XML documents includes XML query language (XQL) and XQuery. These search languages are widely used to search XML documents stored in an electronic document repository of the server and provide a result in a form of XML document desired by the requester.

As an example, the XQL will be described below. The XQL is a means for searching and selecting positions of data fields and texts existing within the XML document. The XML files are used to transmit data collection between computers on the web. The XQL provides a tool for searching or selecting a specific item in the data collection within the XML files. This is based on a format syntax that is used in an extensible style sheet language (XSL). The XQL is proposed as an extended version of the XSL.

For processing, the XSL format language uses a simple directory notation to indicate a specific element name. For example, "books/authors" represents "a searching of all author components within all book components in a specific context such as an XML file". The XQL adds a capacity of using Boolean logic, selecting components and indexing component collections to the directory format notation. The XQL makes it possible to produce programs capable of searching the electronic document repository, which stores the XML files, and providing hyperlinks linked to specific components.

As described above, in a related art method for requesting a supply of the electronic documents using these search languages, a user requesting the electronic document should learn an additional search language and designate a structure of the XML document to be supplied as the search result. Accordingly, the related art XQL method is ineffective to the user who wants to request and receive the electronic document created based on the previously designated syntax.

Preferred embodiments of XML-based electronic document request methods using a prescribed syntax according to the present invention will now be described. XML-based electronic documents can use a document type definition (DTD) or an XML schema language to define syntaxes. These syntaxes define a structure of an entire electronic document and restrict name and occurrence frequency of each element, order, whether it is a required element or an optional element, attribute of each element, etc. The electronic documents become valid documents with respect to the syntaxes provided by these languages.

Preferred embodiments of the present invention can constitute a request document requesting desired information by using a prescribed syntax, and can request supply of information from an electronic document repository by using the request document. In other words, a requester requests the supply of the information to the electronic document repository by transmitting the request document or the like with the desired information recorded based on the prescribed syntax.

A request document is preferably constituted with only an element name/attribute name without detailed information values of element names/attribute names based on the syntax. Additionally, if there is an information that can limit the to-be-supplied information, an identifier or an element name/attribute name based on the syntax can be recorded in the request document together with specific values.

Accordingly, when the requester sends the request document to the electronic document repository for the purpose of requesting the supply of the electronic document, the syntax of a required element or a required attribute among the limitations of the prescribed syntaxes may not be observed. In other words, because the supply of the electronic document is requested to the repository after inserting only the desired element or the attribute values, the required element or the required attribute can be omitted if there is not the desired information value.

In the element name/attribute name representing the to-be-supplied information and having an identifier value or specific value for limiting the information, the electronic document described according to a hierarchy structure of the prescribed syntax is preferably used as the request document. The electronic document can be supplied that includes the value of the desired element name/attribute name and satisfies the value of the element name/attribute name used as the identification value or the conditions.

In other words, according to embodiments of the XML-based electronic document request/supply method of the present invention, a supply of the electronic document having the corresponding information is requested by using a request document in which the identification value of the to-be-requested electronic document and the to-be-supplied element are described according to the hierarchy structure of the prescribed syntax.

Additionally, according to embodiments of the XML-based electronic document request/supply method of the present invention, an attribute value is added at the provider side to notify an invalidity of the contents to be deleted if contents of the supplied document are deleted or not valid any more. Further, according to embodiments of the XML-based electronic document request/supply method of the present invention, if predetermined contents of the supplied document are deleted or not valid any more, the invalidity of the document is preferably notified by inserting only the to-be-deleted contents into the element name.

The embodiments of a electronic document request/supply method according to the present invention can be applied, for example, to the requester requesting the supply of the electronic document, the provider supplying the requested electronic document, and a system configured with a network connecting the requester and the provider. Also, the electronic document request/supply method can be applied to a system that provides only basic information under an environment such as a broadcasting program providing system and then receives an additional information via a network according to the user's request.

For example, a syntax of the electronic document of the broadcasting program can be defined as follows, and an electronic document request/supply method will be described with reference to FIG. 2. FIG. 2 is an exemplary view showing a syntax structure of a broadcasting program produced by a related art method of creating an XML-based electronic document.

As shown in FIG. 2, it is assumed that the broadcasting program has a title and program identifier (ID) information uniquely indicating the program, an information on a broadcast such as broadcasting service, time and duration, and information on contents such as synopsis, review, and casting. This information for the broadcasting program—such as title, program ID, information on broadcast such as broadcasting service, time and duration, and information on contents such as synopsis, review, and casting—is "data about data" or "metadata." Herein, the case where the title, the program identifier, the time and the duration are defined as the required elements will be described. Accordingly, as shown in FIG. 2, a solid line can represent a required element and a dotted line can represent an optional element.

As shown in FIGS. 3 and 4, these programs can be illustrated using a DTD and an XML schema. FIG. 3 is an exemplary view of the DTD showing syntax of the broadcasting program produced by a related art method of creating the XML-based electronic document, and FIG. 4 is an exemplary view of the XML schema showing syntax of the broadcasting program created by a related method of creating the XML-based electronic document.

The DTD is regulations for applying XML in order to markup a specific document type and determined by its application. A definition of the document type can include an element type that can be expressed by the markup, an element relationship and attribute, and a regulation related to a reference.

In FIGS. 5 and 6, there are shown broadcasting programs actually created based on the syntax. FIGS. 5 and 6 are views of exemplary broadcasting program electronic documents created by a related art method of creating the XML-based electronic document. Here, the title that is the required element is all contained, but the optional elements may not be contained. As shown in FIGS. 5-6, for example, data about electronic document contents such as a title, a synopsis and the like of a television program can generally be considered metadata.

FIG. 7 is a diagram that shows an exemplary view of a request document requesting a supply of an electronic document created by the XML-based electronic document request method according to an embodiment of the present invention. It is assumed that the requester requests the review of a specific program to the broadcasting station. At this time, the requester can create the request document as shown in FIG. 7.

As shown in FIG. 7, the request document can use the same syntax of FIGS. 5 and 6. Although the present invention is not intended to be so limited. However, the title element that is the required element is omitted, and the supply of the electronic document is requested to the repository after insetting "the identifier" element of the desired program and "the review" element.

Accordingly, the request document can be supplied to the electronic document repository by the request of the user or the like who produces the request document shown in FIG. 7. FIG. 8 is a diagram that shows an exemplary view of the requested electronic document supplied according to the request document of FIG. 7. Further, as shown in FIG. 8, the electronic document including the requested information can be supplied to the electronic document application system utilized by the users according to the prescribed syntax.

As a further example, it is assumed that the requester requests programs in which a specific actor or actress performs. At this time, the requester can create the request document as shown in FIG. 9. As shown in FIG. 9, the request document can use the same syntax of FIGS. 5 and 6. However, the tide element that is the required element is omitted, and the supply of the electronic document is requested to the repository after inserting only "the casting" element of the desired program. Here, since the "title" element and the information on "the broadcast" are the required elements, this information is automatically provided even if they are not marked in the request document.

Accordingly, as shown in FIG. 10, the electronic document repository supplies the electronic document application system utilized by the users with the electronic document including the requested information according to the prescribed syntax in response to the user's request.

According to the embodiments of XML-based electronic document request/supply methods of the present invention, the requester can request a supply of the electronic document stored in the electronic document repository by using the prescribed syntax (e.g., without learning a syntax of the additional language for the search request). Additionally, embodiments of methods of the present invention can be performed more effectively since the electronic document supplied from the electronic document repository is processed by using only the system, which processes the prescribed syntax based on the XML.

At this time, the element name/attribute name of the request document is selectively recorded among the required/optional elements and/or the required/optional attributes for the syntax defining the constructed electronic document structure. The element name/attribute name selectively recorded in the request document can represent the element name/attribute name of information that should be provided to the to-be-supplied electronic document. Further, if corresponding values are recorded in the element/attribute selectively recorded in the request document, the recorded values of the element name/attribute name represents the conditions of the element name/attribute name that should be satisfied by the electronic document provided in response to the user's request.

Further, if there are the contents to be deleted due to a change in the contents of the document, for example, if a prearranged broadcasting program is cancelled, the processes can be performed as shown in FIGS. 11 and/or FIG. 12. In other words, as shown in FIGS. 11 and 12, cancellation of the prearranged broadcasting program, for example, can be notified by adding an invalid or deletion element name or attribute name or the like.

FIG. 11 is a diagram that shows an exemplary view of an embodiment providing information on a deleted document by supplying a document with an element notifying that the document is invalid according to an embodiment of an XML-based electronic document supply method of the present invention. FIG. 12 is an exemplary view of providing information on a deleted document by supplying a document with an attribute notifying that the document is invalid according to another embodiment of an XML-based electronic document supply method of the present invention.

In more detail, information on the cancellation of a prearranged broadcasting program, for example "Larry King," can be provided by adding the invalid element as shown in FIG. 11. At this time, the to-be-deleted contents contained as the invalid contents within the supplied document can be determined by an identifier element that can identify the document. If the identifier element is supplied as the contents of the invalid element, the corresponding entire document can be deleted. If the identifier (e.g., identifier element) that can identify the corresponding document within the supplied document is contained and only the to-be-deleted contents of the corresponding document are contained as the invalid element name, only the corresponding contents contained within the invalid element name are preferably deleted.

Further, the information on the cancellation of the prescribed broadcasting program, for example "Larry King," can be provided simply by adding the attribute name <Program Invalid="true"> as exemplarily shown in FIG. 12. At this time, the attribute name notifying the invalidity of the supplied document can be an attribute of the identifier element name that can identify the to-be-deleted document. In case of providing the attribute name notifying that the attribute of the identifier element name becomes invalid, the corresponding entire document that can be identified by the corresponding document identifier is deleted.

Additionally, if the identifier that can identify the corresponding document within the supplied document is contained and only the to-be-deleted contents of the corresponding document are provided as an attribute notifying the invalidity, only the corresponding contents among the documents identified by the document identifier are preferably deleted.

According to embodiments of XML-based electronic document supply methods of the present invention, it is possible to gradually upgrade the document by deleting the contents, that are deleted or not valid any more because of a change in the contents of the document, without having to newly supply the document, or by supplying only the invalid contents.

As described above, preferred embodiments of methods for document request and/or supply have various advantages. According to preferred embodiments of the present invention, XML-based electronic documents can be effectively supplied using the previously prescribed syntax without learning the syntax of additional languages to request the electronic document. Further, an electronic document application system utilized by the requester can request the search of the electronic document and process the electronic document supplied from the electronic document repository using only an apparatus and/or algorithm for processing the prescribed syntax. In addition, if some or the entire contents of the supplied document are deleted or become invalid, the use of the invalid document or its contents can be reduced or prevented by simply notifying the deleted contents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method implemented by an apparatus for supplying electronic documents based on XML, the method comprising:

supplying from a provider of a program broadcasting system to a client in the program providing system an electronic document that uses XML to describe programming information about a plurality of television broadcast programs scheduled for broadcast in the program broadcasting system, the electronic document having a hierarchical structure based on a prescribed syntax, the hierarchical structure including an upper fragment and a plurality of lower fragments located below the upper fragment in the hierarchical structure to describe, for each of the scheduled television broadcast programs, a program identifier, a title, broadcast information and corresponding program content information; and supplying from the provider to the client an update document to update the previously supplied electronic document, the update document having a structure based on the prescribed syntax and including the upper fragment and an invalid element to identify an invalid fragment as one of the lower fragments in the hierarchical structure, wherein the invalid fragment is related to one of the television broadcast programs described in the previously supplied electronic document, and wherein the update document indicates deletion of said invalid fragment from the electronic document according to the invalid element.

2. The method of claim 1, wherein when the invalid element indicates the deletion of only said invalid fragment, only the invalid fragment is deleted from the previously supplied electronic document at the client.

3. A method implemented by an apparatus for updating a previously supplied electronic document describing programming information about a plurality of television broadcast programs scheduled for broadcast in a program broadcasting system, wherein the previously supplied electronic document is stored in a client of the program broadcasting system and has a hierarchical structure based on a prescribed syntax, the hierarchical structure including an upper fragment and a plurality of lower fragments located below the upper fragment in the hierarchical structure to describe, for each of the scheduled television broadcast programs, a program identifier, a title, broadcast information and corresponding program content information, the method comprising:

requesting by the client an updated version of said previously supplied electronic document from a provider in the program broadcasting system;

in response to the request, receiving from the provider at the client an update document based on XML to update content in the previously supplied electronic document, wherein the update document has a structure based on the prescribed syntax and includes the upper fragment and an invalid element which indicates that one of the lower fragments of the previously supplied electronic document is invalid, wherein the invalid fragment is related to one of the television broadcast programs scheduled for broadcast in the program broadcasting system; and deleting said invalid fragment from the previously supplied electronic document as indicated by the invalid element at said client.

4. A method implemented by an apparatus for updating a previously supplied electronic document based on XML, wherein said previously supplied electronic document describes programming information about a plurality of television broadcast programs scheduled for broadcast in a program broadcasting system, and the previously supplied electronic document is stored in a client of the program broadcasting system and has a hierarchical structure based on a prescribed syntax, the hierarchical structure including an upper fragment and a plurality of lower fragments located below the upper fragment in the hierarchical structure to describe, for each of the scheduled television broadcast programs, a program identifier, a title, broadcast information and corresponding program content information, the method comprising:

requesting by the client an updated version of said previously supplied electronic document from a provider in the program broadcasting system;

in response to the request, receiving from the provider at the client an update document for updating said previously supplied electronic document, said update document having a structure based on the prescribed syntax and including the upper fragment and an invalid element which indicates that one of the lower fragments of the previously supplied electronic document is invalid, wherein said invalid fragment is identified by the invalid element and is related to one of the television broadcast programs scheduled for broadcast in the program broadcasting system; and deleting said invalid fragment from the previously supplied electronic document as indicated by the invalid element at said client.

5. The method of claim 4, wherein said prescribed syntax is defined by an XML schema.

6. The method of claim 4, wherein said deleting includes identifying in the previously supplied electronic document said invalid fragment identified by said invalid element at said client.

7. The method of claim 4, wherein said invalid fragment is indicated to be invalid by an invalid attribute.

8. The method of claim 7, wherein said prescribed syntax is defined by an XML schema.

9. A method implemented by an apparatus for updating a previously supplied electronic document related to a schedule of broadcasting a plurality of television broadcast programs in a program broadcasting system, wherein the previously supplied electronic document is stored in a client of the program broadcasting system and has a hierarchical structure based on a prescribed syntax, the hierarchical structure including an upper fragment and a plurality of lower fragments located below the upper fragment in the hierarchical structure to describe, for each of the television broadcast programs, a program identifier, a title, broadcast information and corresponding program content information, the method comprising:

requesting by the client an updated version for said previously supplied electronic document from a provider in the program broadcasting system;

in response to the request, receiving from the provider at the client an update document for updating the previously supplied electronic document, the update document having a structure based on the prescribed syntax and including the upper fragment and an invalid element which indicates an invalid fragment as one of the lower fragments of the previously supplied electronic document, wherein said invalid fragment is related to one of the television broadcast programs scheduled for broadcast in the program broadcasting system; and deleting said invalid fragment from the previously supplied electronic document at said client as indicated by the invalid element in the update document supplied from said provider.

10. The method of claim 9, wherein said invalid element is defined in said prescribed syntax.

11. The method of claim 10, wherein said syntax is XML schema.

12. The method of claim 9, wherein said deleting includes identifying in the previously supplied electronic document said invalid fragment identified by said invalid element at said client.

13. The method of claim 9, wherein said invalid fragment is indicated to be invalid by an invalid attribute.

14. The method of claim 13, wherein said invalid attribute is defined in said prescribed syntax.

15. The method of claim 14, wherein said syntax is XML schema.

16. A method implemented by an apparatus for updating a previously supplied electronic document providing programming information related to broadcasting a plurality of television broadcast programs scheduled for broadcast in a program broadcasting system, wherein said previously supplied electronic document is stored in a client of the program broadcasting system and has a hierarchical structure based on a prescribed syntax, the hierarchical structure including an upper fragment and a plurality of lower fragments located below the upper fragment in the hierarchical structure to describe, for each of the scheduled television broadcast programs, a program identifier, a title, broadcast information and corresponding program content information, the method comprising:

receiving at a provider of the program broadcasting system a request from said client for an updated version of said previously supplied electronic document; and supplying from the provider to said client an update document to update the previously supplied electronic document, the update document having a structure based on the prescribed syntax and including the upper fragment and an invalid element, the invalid element indicating that one of the lower fragments of said previously supplied electronic document is invalid, wherein said invalid fragment is identified by the invalid element to be deleted from the previously supplied electronic document, and the invalid fragment is related to one of the television broadcast programs scheduled for broadcast in the program broadcasting system.

17. The method of claim 16, wherein said invalid element is defined in said prescribed syntax.

18. The method of claim 17, wherein said syntax is XML schema.

19. The method of claim 16, wherein said invalid fragment is indicated to be invalid by an invalid attribute.

20. The method of claim 19, wherein said invalid attribute is defined in said prescribed syntax.

21. The method of claim 20, wherein said syntax is XML schema.

22. A method implemented by an apparatus for updating a previously supplied electronic document providing programming information related to broadcasting a plurality of television broadcast programs scheduled for broadcast in a program broadcasting system, wherein said previously supplied electronic document is stored in a client of the program broadcasting system and has a hierarchical structure based on a prescribed syntax, the hierarchical structure including an upper fragment and a plurality of lower fragments located below the upper fragment in the hierarchical structure to describe, for each of the scheduled television broadcast programs, a program identifier, a title, broadcast information and corresponding program content information, the method comprising:

identifying a version of said previously supplied electronic document as invalid;

from the client, receiving at a provider of the program broadcasting system a request for an updated version of said previously supplied electronic document; and supplying from the provider to said client an update document to update the previously supplied electronic document, the update document having a structure based on the prescribed syntax and including the upper fragment and an invalid element, the invalid element indicating that one of the lower fragments of said previously supplied electronic document is invalid, wherein said invalid fragment is identified by the invalid element to be deleted from the previously supplied electronic document, and the invalid fragment is related to one of the television broadcast programs scheduled for broadcast in the program broadcasting system.

23. The method of claim 22, wherein said invalid element is defined in said prescribed syntax.

24. The method of claim 23, wherein said syntax is XML schema.

25. The method of claim 22, wherein said invalid fragment is indicated to be invalid by an invalid attribute.

26. The method of claim 25, wherein said invalid attribute is defined in said prescribed syntax.

27. The method of claim 26, wherein said syntax is XML schema.

28. A method implemented by an apparatus for processing a response to a request for updating a previously supplied electronic document related to a schedule of broadcasting a plurality of television broadcast programs in a program broadcast system, wherein said previously supplied electronic document is stored in a client of the program broadcasting system and has a hierarchical structure based on a prescribed syntax, the hierarchical structure including an upper fragment and a plurality of lower fragments located below the upper fragment in the hierarchical structure to describe, for each of the scheduled television broadcast programs, a program identifier, a title, broadcast information and corresponding program content information, the method comprising:

receiving at the client an update document from a provider in the program broadcasting system, the update document having a structure based on the prescribed syntax and including the upper fragment and an invalid element to delete a first lower fragment of said previously supplied electronic document, wherein said invalid element indicates that said first lower fragment is invalid, and wherein said invalid first lower fragment is identified by the invalid element and is related to one of the scheduled television broadcast programs;

identifying in the previously supplied electronic document said invalid first lower fragment identified by said invalid element at said client; and controlling to delete said identified invalid first lower fragment from the previously supplied electronic document at said client.

29. The method of claim 28, wherein said invalid element is defined in said prescribed syntax.

30. The method of claim 29, wherein said syntax is XML schema.

31. The method of claim 28, wherein said invalid first lower fragment is indicated to be invalid by an invalid attribute.

32. The method of claim 31, wherein said invalid attribute is defined in said prescribed syntax.

33. The method of claim 32, wherein said syntax is XML schema.

34. A method implemented by an apparatus for replying to a request for updating a previously supplied electronic document related to a schedule of broadcasting a plurality of television broadcast programs in a program broadcast system, wherein said previously supplied electronic document is stored in a client of the program broadcasting system and has a hierarchical structure based on a prescribed syntax, the hierarchical structure including an upper fragment and a plurality of lower fragments located below the upper fragment in the hierarchical structure to describe, for each of the scheduled television broadcast programs, a program identifier, a title, broadcast information and corresponding program content information, the method comprising:

supplying said client with an update document from a provider of the program broadcasting system, the update document having a structure based on the prescribed syntax and including the upper fragment and an invalid element to delete a first lower fragment of said previously supplied electronic document at the client, wherein said invalid element indicates that said first lower fragment is invalid and should be deleted from the previously supplied electronic document, wherein the invalid first lower fragment is related to one of the scheduled television broadcast programs.

35. The method of claim 34, wherein said invalid element is defined in said prescribed syntax.

36. The method of claim 35, wherein said syntax is XML schema.

37. The method of claim 34, wherein said invalid first lower fragment is indicated to be invalid by an invalid attribute.

38. The method of claim 37, wherein said invalid attribute is defined in said prescribed syntax.

39. The method of claim 38, wherein said syntax is XML schema.

40. A method implemented by an apparatus for processing a response to a request for updating a previously supplied electronic document providing programming information about a plurality of television broadcast programs scheduled for broadcast in a program broadcasting system, wherein the previously supplied electronic document has a hierarchical structure based on a prescribed syntax, the hierarchical structure including an upper fragment and a plurality of lower fragments located below the upper fragment in the hierarchical structure to describe, for each of the scheduled television broadcast programs, a program identifier, a title, broadcast information and corresponding program content information, wherein the response to the request provides an update document having a structure based on the prescribed syntax and including the upper fragment and an invalid element which indicates that one of the lower fragments of the previously supplied electronic document is invalid, wherein said invalid fragment is related to one of the scheduled television broadcast programs, the method comprising:

identifying said invalid fragment in the previously supplied electronic document by using the invalid element of the update document at said client; and controlling to delete said identified invalid fragment from the previously supplied electronic document at said client.

41. The method of claim 40, wherein said invalid element is defined in said prescribed syntax.

42. The method of claim 41, wherein said syntax is XML schema.

43. The method of claim 40, wherein said invalid fragment is indicated to be invalid by an invalid attribute.

44. The method of claim 43, wherein said invalid attribute is defined in said prescribed syntax.

45. The method of claim 44, wherein said syntax is XML schema.

46. The method of claim 1, wherein the program content information includes a synopsis, casting information or a review.

47. The method of claim 1, wherein the broadcast information specifies a broadcast service, a broadcast time, and a broadcast duration.

48. The method of claim 3, wherein the program content information includes a synopsis, casting information or a review.

49. The method of claim 3, wherein the broadcast information specifies a broadcast service, a broadcast time, and a broadcast duration.

50. The method of claim 4, wherein the program content information includes a synopsis, casting information or a review.

51. The method of claim 4, wherein the broadcast information specifies a broadcast service, a broadcast time, and a broadcast duration.

52. The method of claim 9, wherein the program content information includes a synopsis, casting information or a review.

53. The method of claim 9, wherein the broadcast information specifies a broadcast service, a broadcast time, and a broadcast duration.

54. The method of claim 1, wherein the invalid element in the update document includes the invalid fragment.

55. The method of claim 1, wherein the invalid element includes a fragment identifier to identify the invalid fragment.

56. The method of claim 55, wherein the fragment identifier includes date information.

57. The method of claim 1, wherein the invalid element is provided to the client in the update document in accordance with the hierarchical structure of the electronic document.

58. The method of claim 1, wherein the invalid element includes information to be invalidated.

59. The method of claim 1, wherein the update document indicates deletion of said invalid fragment from the electronic document based on an element identifier or an element version which indicates a date and a time.

60. The method of claim 28, wherein the invalid element in the update document includes the invalid first lower fragment.

61. The method of claim 28, wherein the invalid element includes a fragment identifier to identify the invalid first lower fragment.

62. The method of claim 58, wherein the fragment identifier includes date information.

63. A method implemented by an apparatus for supplying electronic documents based on XML, the method comprising:

supplying from a provider of a program broadcasting system to a client in the program providing system an electronic document that uses XML to describe programming information about a plurality of television broadcast programs scheduled for broadcast in the program broadcasting system, the electronic document having a hierarchical structure based on a prescribed syntax, the hierarchical structure including an upper fragment and a plurality of lower fragments located below the upper fragment in the hierarchical structure to describe, for each of the scheduled television broadcast programs, a program identifier, a title, broadcast information and corresponding program content information; and supplying from the provider to the client an update document to update the previously supplied electronic document, the update document having a structure based on the prescribed syntax and including the upper fragment and an invalid attribute to identify an invalid fragment as one of the lower fragments in the hierarchical structure, wherein the invalid fragment is related to one of the television broadcast programs described in the previously supplied electronic document, and wherein the update document indicates deletion of said invalid fragment from the electronic document according to the invalid attribute.

64. The method of claim 63, wherein the update document includes the invalid fragment.

65. A method implemented by an apparatus for updating a previously supplied electronic document describing programming information about a plurality of television broadcast programs scheduled for broadcast in a program broadcasting system, wherein the previously supplied electronic document is stored in a client of the program broadcasting system and has a hierarchical structure based on a prescribed syntax, the hierarchical structure including an upper fragment and a plurality of lower fragments located below the upper fragment in the hierarchical structure to describe, for each of the scheduled television broadcast programs, a program identifier, a title, broadcast information and corresponding program content information, the method comprising:

at the client, receiving an update document from a provider of the program broadcasting system to update content in the previously supplied electronic document, wherein the update document is based on XML and has a structure based on the prescribed syntax and includes the upper fragment and an invalid attribute which indicates that one of the lower fragments of the previously supplied electronic document is invalid, wherein the invalid fragment is related to one of the television broadcast programs scheduled for broadcast in the program broadcasting system; and deleting said invalid fragment from the previously supplied electronic document as indicated by the invalid attribute at said client.

66. The method of claim 65, further comprising:

requesting by the client an updated version of said previously supplied electronic document from the provider in the program broadcasting system, wherein receiving the update document at the client includes receiving the update document in response to the request.

67. The method of claim 65, wherein the update document includes the invalid fragment.

* * * * *